United States Patent
Mackenzie

[15] 3,677,619
[45] July 18, 1972

[54] READOUT DEVICES WITH LIGHT CONDUCTING CHANNELS

[72] Inventor: Elbert K. Mackenzie, North Wales, Pa.

[73] Assignee: Electro-Mechanical Instrument Company, Inc., Perkasie, Pa.

[22] Filed: April 20, 1970

[21] Appl. No.: 30,034

[52] U.S. Cl. ..................350/110, 116/129 L, 116/129 M, 116/DIG. 26, 240/2.1, 350/96 B
[51] Int. Cl. .......................................G02b 27/02
[58] Field of Search............350/96 R, 96 B, 110–116; 356/138; 324/97; 116/114 L, 114 M, 124.4, 129 L, 129 M, DIG. 26; 240/2.1

[56] References Cited

UNITED STATES PATENTS

| | | | |
|---|---|---|---|
| 2,471,800 | 5/1949 | Von Mülinen | 350/96 B |
| 3,496,846 | 2/1970 | Clark | 350/96 B |
| 2,333,492 | 11/1943 | Ridge | 116/129 M |
| 3,349,406 | 10/1967 | Perry et al. | 350/96 B |
| 3,467,960 | 9/1969 | Hosker | 350/96 B |
| 3,554,109 | 1/1971 | Street et al. | 350/96 B |
| 3,559,555 | 2/1971 | Street | 350/96 B |

FOREIGN PATENTS OR APPLICATIONS

| | | | |
|---|---|---|---|
| 1,167,617 | 10/1969 | Great Britain | 350/96 B |

Primary Examiner—David Schonberg
Assistant Examiner—Paul R. Miller
Attorney—Woodcock, Phelan & Washburn

[57] ABSTRACT

In a readout device a beam of light is moved to a position which represents an input condition. An electrical meter movement rotates a light mask which produces the beam of light. Light-conducting channels are positioned to selectively receive the beam of light. Output means at the other end of the light channels digitally indicate the input condition by the selective illumination from said beam of light.

13 Claims, 4 Drawing Figures

Patented July 18, 1972

READOUT DEVICES WITH LIGHT CONDUCTING CHANNELS

BACKGROUND OF THE INVENTION

This invention relates to readout devices and more particularly to an electrical meter-type device in which light-conducting channels selectively illuminate a digital output indicator.

Many applications require a readout device with an indicator having a fairly long scale which is easily readable in darkness as well as in bright sunlight. One example is for use with electrical tuners of the capacitance tuner type, used in radio and TV sets. Other uses include pressure gages and servo motors.

The present invention makes use of a different type of output indicator which is selectively illuminated by light-conducting channels. The electrical meter movement used to selectively illuminate the channels is of conventional type, one example being shown in U.S. Pat. No. 2,970,267, Pfeffer.

SUMMARY OF THE INVENTION

In accordance with an important aspect of this invention, light-conducting channels are selectively illuminated by a moving beam of light which represents an input condition. In one particular embodiment an electrical meter movement positions a rotating mask in accordance with the input condition.

In accordance with another aspect of the invention, a cylindrical light source is positioned so that the distance from the light source to the beam-producing portion of the mask remains constant as the mask moves. By this means a focused beam of light is applied to the input end of each selected light channel.

In accordance with another important aspect of this invention the readout end of each light-conducting channel can be positioned with respect to the read-in end of each channel to obtain the desired readout geometry. In one particular embodiment the light channels are flexible, transparent, plastic tubes sometimes referred to as optical fibers. These flexible channels may, for example, be arranged with the readout ends in a straight line to create a readout geometry which has the appearance of a flat scale. Also, the input ends of these flexible light-conducting channels can be separated so that the beam of light can strike only one channel at a time. In this manner, discrete reading intervals are obtained.

In another specific embodiment of the invention the input ends and the output ends of the light channels are encapsulated so that the relationship between the input condition and the output condition is permanently established.

In still another specific embodiment of the invention, adjusting levers are provided to adjust the angular position of the input ends of the light channels to change the selective illumination of the light channels in response to a given input condition. In this embodiment the input ends of the light channels may be disposed in a spiral about the axis of rotation of the mask. This allows the use of light channels having input ends with cross-sections which are larger for a given number of light channels than could otherwise be used.

In accordance with another important aspect of this invention simple multiple scale switching is possible by shifting the scale marks on the output means. Such scale shifting is particularly desirable in switching between UHF and VHF channels on a TV set.

The foregoing and other objects, features, and advantages may be better understood from the following more detailed description, the drawings and the claims.

DESCRIPTION OF A PARTICULAR EMBODIMENT

Figure 1:
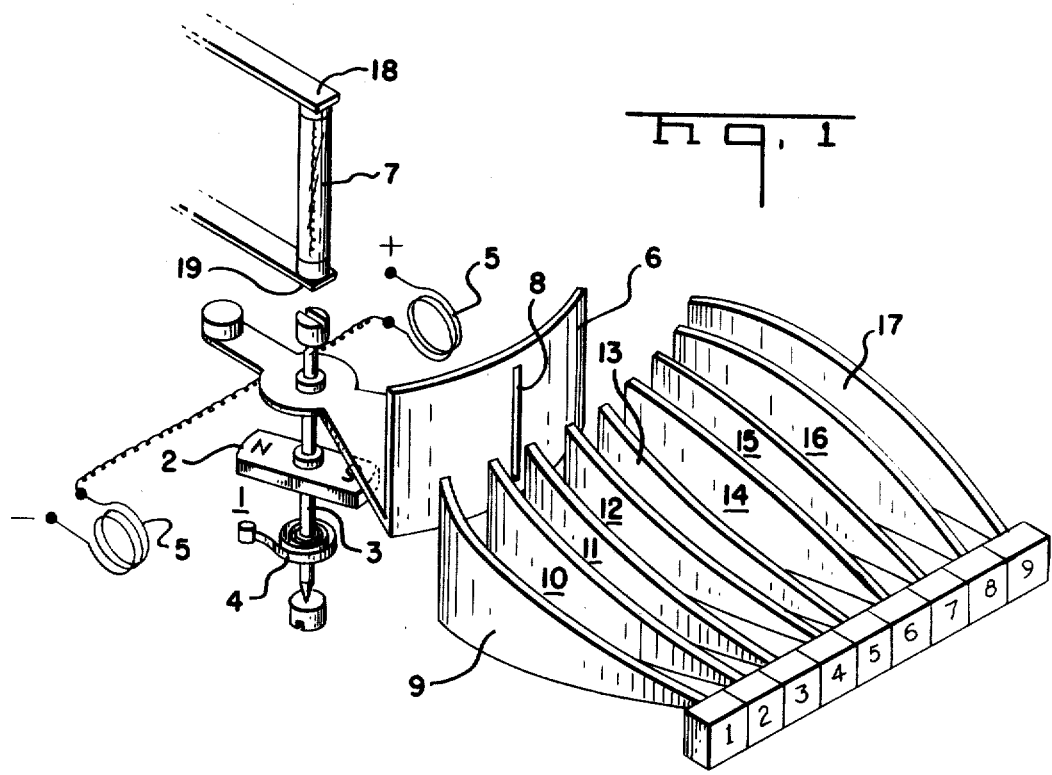
FIG. 1 shows the readout device of this invention.

Referring to FIG. 1 the readout device includes a meter movement 1. This meter movement includes moving magnet 2 on an arbor 3 and return spring 4.

An electrical voltage or current, representing an input condition, is applied to the coils 5. Under the influence of the magnetic field produced by the coils 5 the magnet 2 rotates the light mask 6. Mask 6 is illuminated with light from the cylindrical lamp 7, in this case a straight filament lamp. The cylindrical lamp 7 is mounted with the axis of the lamp coincidental with the axis of rotation of the mask 6. The distance from the lamp 7 to the beam-producing portion of the mask, in this case the slit 8, remains constant as the mask rotates. Because of this, a focused beam of light is always applied to the input ends of the light channels 9–17. The sockets 18 and 19 maintain the axial orientation of the cylindrical lamp 7 so that the light produced is repeatable even when the lamp is replaced and is always focused on the input ends of the light channels 9–17.

The output means includes the plastic blocks 20 each bearing a different digital number. These plastic blocks are selectively illuminated by the light channels to indicate the magnitude of the input condition. The output ends of the light channels 9–17 are arranged in a straight line to create a readout geometry which has the appearance of a flat scale. It will be appreciated that because of the flexibility of the light channels 9–17 the relative position of the input and output ends can be varied to obtain other readout geometry.

The light channels 9–17 are constructed of a transparent material having a refractive index which, together with the geometry of the channel, reflects light from the sides of the channel and transmits light only along the longitudinal axis of the channel. One example of material suitable for use is the acrylic plastic sold under the trade names of Plexiglass or Lucite.

In FIG. 1 the input ends of the light-conducting channels 9–17 are separated by an amount such that the beam of light produced by the slit in the mask 6 can strike only one channel at a time. Because of this, discrete reading intervals are obtained. That is, only one of the plastic blocks 20 will be illuminated at a time.

Figure 2:
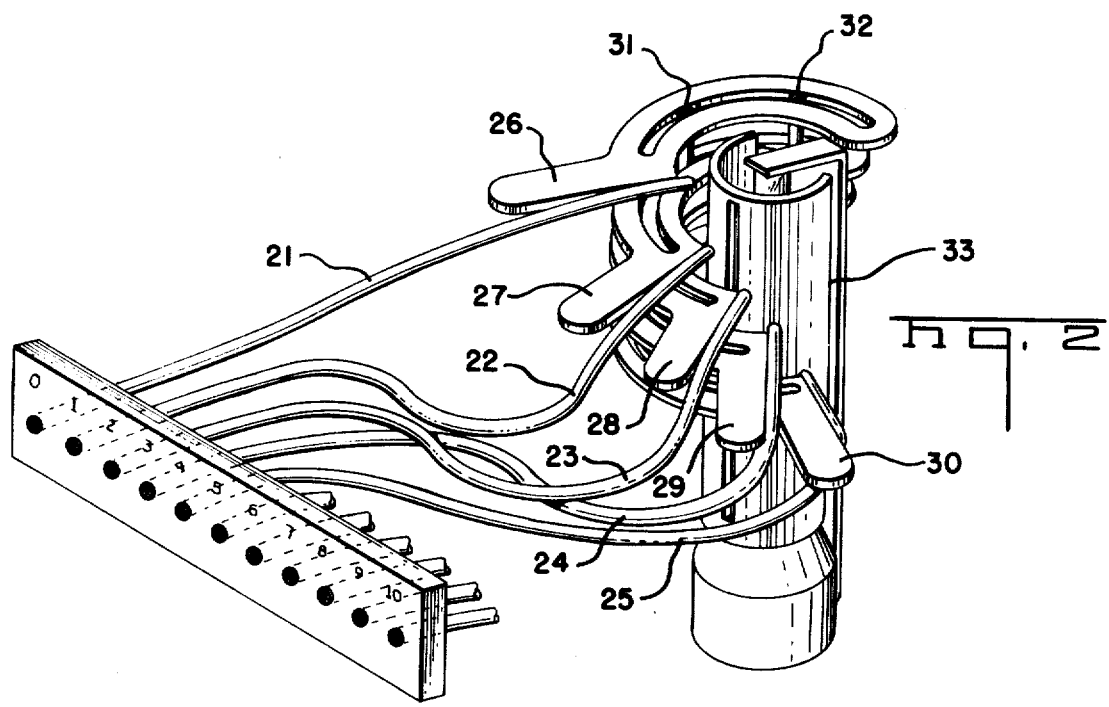
FIGS. 2, 3 and 4 each show modifications of the invention.

FIG. 2 shows a modification of the invention in which the angular position of the input ends of the light channels can be adjusted in a diametral plane while maintaining the radial distance from the axis of rotation of the mask to the input ends of the light channels constant. In order to do this, the input ends of the light channels 21–25 are fastened to independent adjustable levers, the levers 26–30 being shown. The levers are moveable on pins 31 and 32 which extend through slots in each of the levers. As the levers are moved, the angular position of the input end of the attached light channel is changed. This allows adjustment of the selective illumination of the light channel in response to a given input. Note, however, that this arrangement maintains the radial distance from the axis of rotation of the mask 33 to the input end of the light channel constant.

In the readout device shown in FIG. 2 each light channel has its input end in a different diametral plane of the rotating mask. Also, the input ends of the channel are disposed in a spiral about the axis of rotation of the mask. Because of this, it is possible to use light channels having larger cross sections than those shown. If this is done, there will be overlap between the input ends of the light channels. While there will not be discreet reading intervals in this case, such an arrangement has the advantage of being more compact.

In the embodiment of FIG. 2 the light channels 21—25 are multiple strand optical fiber cables. That is, each channel includes a plurality of optical fiber strands encased in an outer cover.

Figure 3:
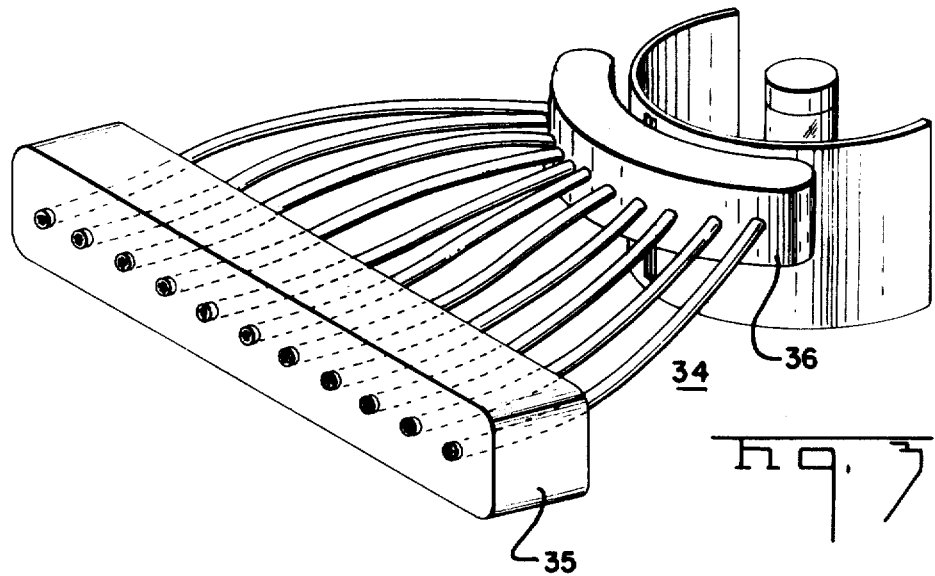

In the modification of FIG. 3 the input ends and the output ends of the light channels are rigidly encapsulated so that the relationship between the input condition and the output indication is permanently established. The optical fibers 34 are encapsulated at the output ends by the viewing bar 35. The input ends are encapsulated in the input bar 36. This provides an economical way of producing duplicate meters in production.

Figure 4:
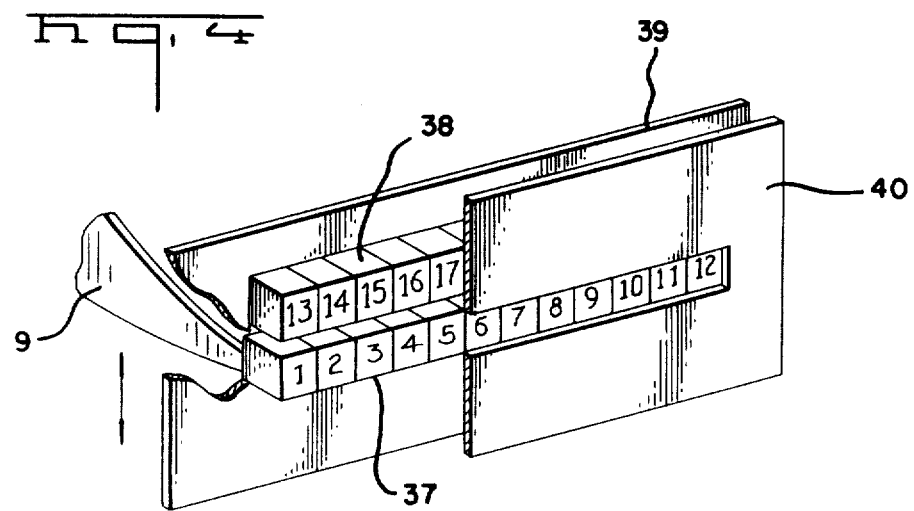

Referring to FIG. 4, there is shown a modification in which scale switching is possible. In this case the readout means includes two sets of plastic blocks 37 and 38. The two sets of plastic blocks are mounted on a slideable plate 39. The plate has a cutout so that light from the light-conducting channels can strike one of the sets of readout blocks. In the position shown the light from the light-conducting channel strikes the plastic blocks 37. However, when the plate 39 slides downwardly, the set of blocks 38 receives light from the light conducting channels. A mask 40 is provided so that only one set of blocks is visible. This type of device provides a convenient means of changing scales. For example, where it is desired to change from VHF to UHF channels on a television set, the plate 39 is merely moved downwardly so that the new set of output indicators is visible.

Certain other modifications will be apparent. For example, while the light-producing portion of the mask has been shown as a slit, the light-producing portion could be the edge of the mask. In this case, the output indication will appear as an advancing or receding line on the output indicator.

Other modifications are within the scope of this invention. The appended claims are, therefore, intended to cover all modifications within the true spirit and scope of the invention.

What is claimed is:

1. A readout device comprising:
    a meter including a rotating arbor extending along the meter axis, a moving magnet mounting on said arbor, and coils for generating a magnetic field which interacts with the magnetic flux of said permanent magnet for moving said permanent magnet and said arbor in response to an input signal applied to said coils,
    a movable mask including a radially outwardly extending portion mounted on and affixed to said rotating arbor and further including an axially extending portion having an aperture therein, said aperture being radially outwardly and axially displaced with respect to said arbor so as to convert a small arcuate path traveled by said arbor into a larger arcuate path traveled by said aperture,
    a light source located substantially along said meter axis and aligned with said aperture so as to produce a beam emanating from said aperture,
    a plurality of light-conducting channels having input ends and output ends respectively, said input ends and said mask being positioned so as to selectively illuminate the input end of one of said light-conducting channels with said beam, and
    output means at the output ends of said light-conducting channels for indicating said input signal by the selective illumination of said light-conducting channels.

2. The readout device recited in claim 1 wherein said aperture of said mask is elongated in a direction substantially parallel with the axis of said meter, the distance from the light source to said aperture remaining constant as said mask moves.

3. The readout device recited in claim 2 wherein said light source is a cylindrical lamp having a filament which is concentric with the axis of the cylinder, and
    socket means for maintaining the axial orientation of said cylindrical lamp so that the light focus produced by said lamp is repeatable when said lamp is replaced.

4. The readout device recited in claim 3 wherein said mask is rotatable and wherein said cylindrical lamp is mounted with the axis of said lamp coincidental with the axis of rotation of said rotating mask.

5. The readout device recited in claim 1 wherein the output ends of the light channels are arranged in a straight line to create a readout geometry which has the appearance of a flat scale.

6. The readout device recited in claim 7 wherein said light channels are constructed of a flexible material so that the relative positions of the input and output ends can be varied.

7. The readout device recited in claim 2 wherein each of said light-conducting channels is constructed of a transparent material having a refractive index which, together with the geometry of the channel, reflects light from the sides of the channel and transmits light only along the longitudinal axis of said channel.

8. The readout device recited in claim 2 wherein the input ends of the light-conducting channels are separated by an amount such that said beam of light can strike only one channel at a time, so that discrete reading intervals are obtained.

9. The readout device recited in claim 1 wherein the input ends and the output ends of said light channels are rigidly encapsulated so that the relationship between the input to said device and the output indication is permanently established.

10. The readout device recited in claim 9 wherein each of said light channels includes a commercially available optical fiber.

11. A readout device comprising
    a light source,
    a rotatable mask including a portion for producing a beam of light representing an input to the device,
    the distance from the light source to said beam producing portion of said mask remaining constant as said mask rotates,
    a plurality of light-conducting channels having input ends and output ends respectively, said beam of light being positioned to selectively illuminate said input ends of said light-conducting channels,
    means for adjusting the angular position of the input ends of each light channel in a diametral plane while maintaining the radial distance from the axis of rotation of said mask to the input ends of the light channels constant, and
    output means at the output ends of said light-conducting channels for indicating said input by the selective illumination of said light-conducting channels.

12. The readout device recited in claim 11 wherein each light channel has its end adjustable in a different diametral plane of the rotating mask.

13. A readout device comprising;
    a light source,
    a rotatable mask including a portion for producing a light beam representing an input to the device,
    the distance from the light source to said beam producing portion of said mask remaining constant as said mask rotates,
    a plurality of light-conducting channels having input ends and output ends respectively, said light beam being positioned to selectively illuminate the input ends of said light-conducting channels, said light-conducting channels being disposed in a spiral about the axis of rotation of the mask so that the cross-sections of said input ends of said light-conducting channels can be larger for a given number of said light-conducting channels, and
    output means at the output ends of said light-conducting channels for indicating the input by the selective illumination of said light-conducting channels.

* * * * *